United States Patent
Hogenhout

(10) Patent No.: US 10,022,887 B2
(45) Date of Patent: Jul. 17, 2018

(54) MITER SAW EXTENDABLE FENCE ATTACHMENT

(71) Applicant: Johannes Hogenhout, Penn Hills, PA (US)

(72) Inventor: Johannes Hogenhout, Penn Hills, PA (US)

( * ) Notice: Subject to any disclaimer, the term of this patent is extended or adjusted under 35 U.S.C. 154(b) by 0 days.

(21) Appl. No.: 15/248,471

(22) Filed: Aug. 26, 2016

(65) Prior Publication Data
US 2018/0056540 A1 Mar. 1, 2018

(51) Int. Cl.
*B27B 27/06* (2006.01)
*B23D 45/02* (2006.01)

(52) U.S. Cl.
CPC ............ *B27B 27/06* (2013.01); *B23D 45/024* (2013.01); *Y10T 83/7607* (2015.04)

(58) Field of Classification Search
CPC ......... B27B 27/02; B27B 27/04; B27B 27/06; B27B 27/08; B27B 27/10; B23D 45/024; B23D 33/10; Y10T 83/7593; Y10T 83/7607; B23Q 1/015; B23Q 1/5475; B23Q 1/585
See application file for complete search history.

(56) References Cited

U.S. PATENT DOCUMENTS

| | | | |
|---|---|---|---|
| 4,452,117 A | 6/1984 | Brickner et al. | |
| 4,798,113 A | 1/1989 | Viazanko | |
| 4,987,813 A * | 1/1991 | Viazanko | B23D 47/025 144/286.1 |
| 5,038,650 A | 8/1991 | Hodge | |
| 5,105,862 A | 4/1992 | Skinner et al. | |
| D333,768 S | 3/1993 | Schulenberg | |
| 5,644,964 A * | 7/1997 | Price | B23D 47/04 144/243 |
| 5,865,079 A | 2/1999 | Itzov | |
| 5,943,931 A * | 8/1999 | Stumpf | B27B 27/00 83/468.2 |
| 8,250,956 B2 | 8/2012 | Cox et al. | |
| 2009/0095876 A1 | 4/2009 | Bergmann et al. | |
| 2010/0269655 A1* | 10/2010 | Pierga | B23D 45/044 83/165 |
| 2011/0048202 A1* | 3/2011 | Peterson | B23D 45/044 83/471.2 |
| 2016/0052159 A1* | 2/2016 | Lin | B23D 47/025 83/468.1 |
| 2016/0311040 A1* | 10/2016 | Koegel | B23D 59/00 |
| 2016/0332321 A1* | 11/2016 | Chen | B23D 47/025 |

* cited by examiner

*Primary Examiner* — Stephen Choi

(57) ABSTRACT

A miter saw extendable fence attachment for facilitating cutting of long pieces of wood includes a centerpiece that is complementary to a table of a miter saw. The centerpiece is configured for attachment to the table. Each of a pair of extensions comprises a support and a plate. The support is reversibly couplable to a respective opposing end of the centerpiece. The plate extends perpendicularly from a front of the support adjacent to a bottom of the support. The supports are positioned to couple to the centerpiece such that the plates are positioned coplanarly with an upper face of the table. The plates are configured to place a piece of wood for cutting with a blade of the miter saw.

1 Claim, 4 Drawing Sheets

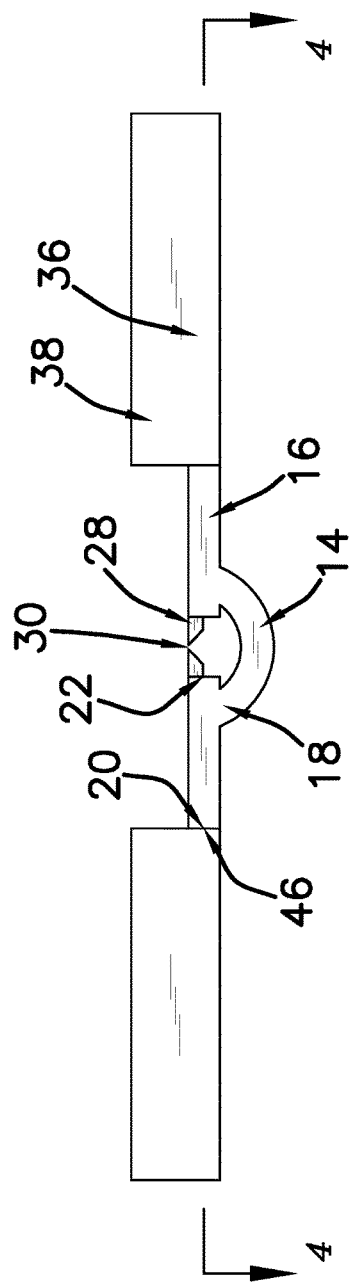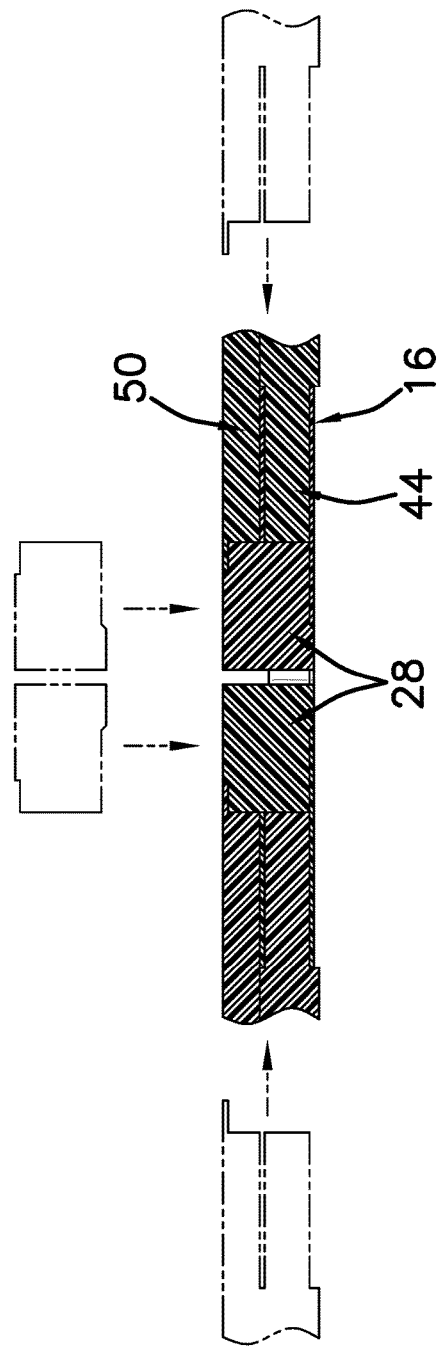

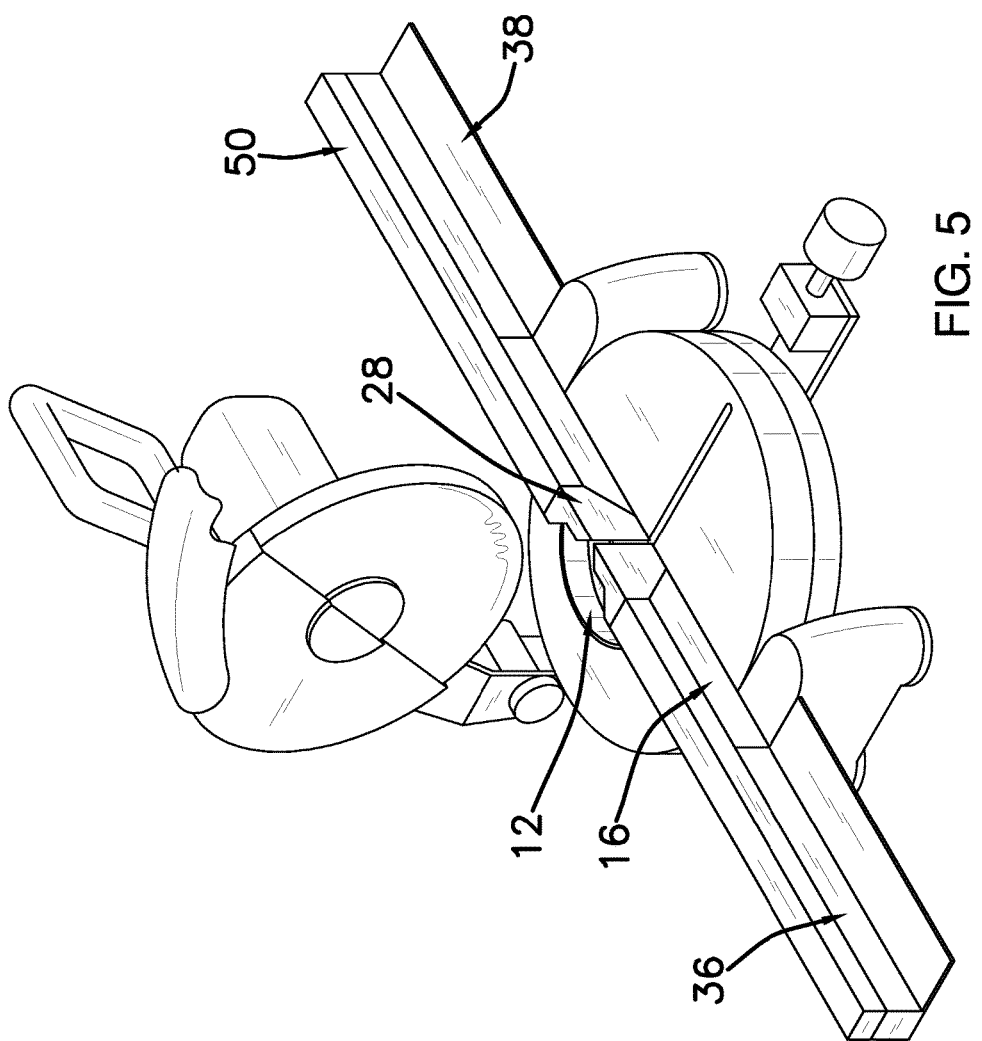

US 10,022,887 B2

MITER SAW EXTENDABLE FENCE ATTACHMENT

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to miter saw attachments and more particularly pertains to a new miter saw attachment for facilitating cutting of long pieces of wood.

BRIEF SUMMARY OF THE INVENTION

An embodiment of the disclosure meets the needs presented above by generally comprising a centerpiece that is complementary to a table of a miter saw. The centerpiece is configured for attachment to the table. Each of a pair of extensions comprises a support and a plate. The support is reversibly couplable to a respective opposing end of the centerpiece. The plate extends perpendicularly from a front of the support adjacent to a bottom of the support. The supports are positioned to couple to the centerpiece such that the plates are positioned coplanarly with an upper face of the table. The plates are configured to place a piece of wood for cutting with a blade of the miter saw.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a bottom view of an embodiment of the disclosure.

FIG. 4 is a cross-sectional view of an embodiment of the disclosure.

FIG. 5 is an in-use view of an embodiment of the disclosure.

DETAILED DESCRIPTION OF THE INVENTION

Figure 1:
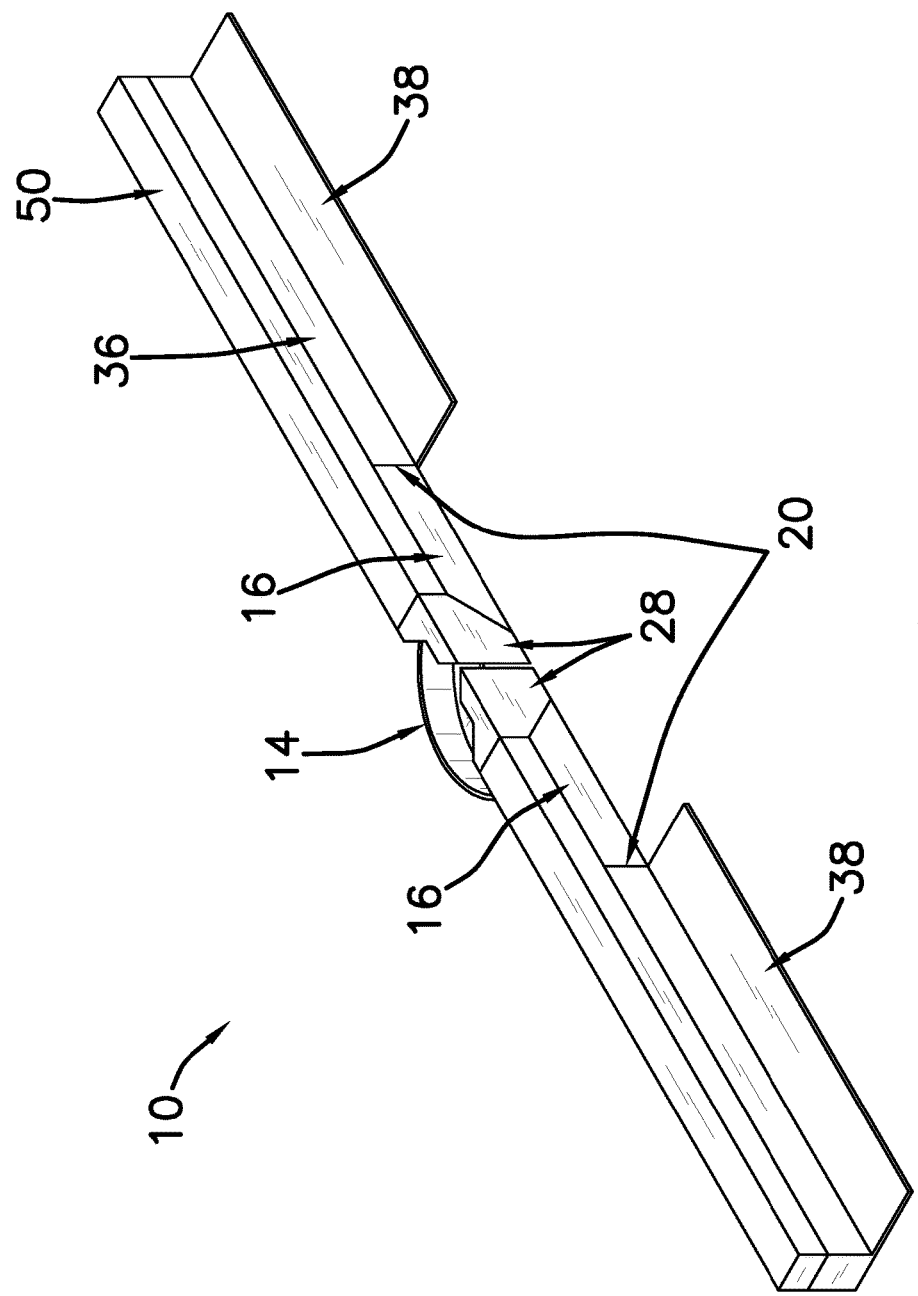
FIG. 1 is an isometric perspective view of a miter saw extendable fence attachment according to an embodiment of the disclosure.
Figure 2:
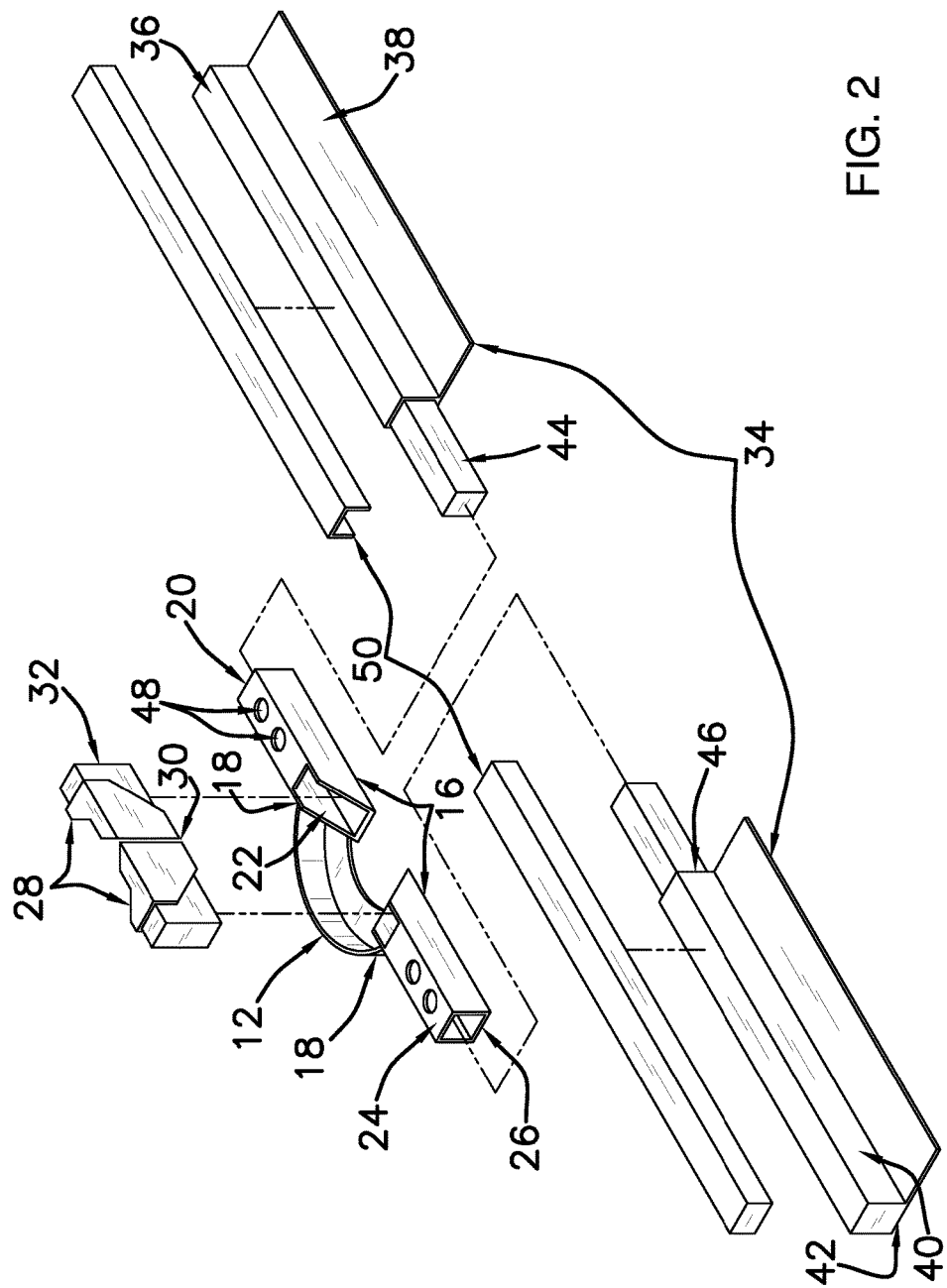
FIG. 2 is an exploded view of an embodiment of the disclosure.

With reference now to the drawings, and in particular to FIGS. 1 through 5 thereof, a new miter saw attachment embodying the principles and concepts of an embodiment of the disclosure and generally designated by the reference numeral 10 will be described.

As best illustrated in FIGS. 1 through 5, the miter saw extendable fence attachment 10 generally comprises a centerpiece 12 that is complementary to a table of a miter saw. The centerpiece 12 is configured to attach to the table. The centerpiece 12 comprises a connector 14 and a pair of guides 16. The connector 14 is arcuate. Each guide 16 is coupled to and extends from a respective opposing endpoint 18 of the connector 14 to define opposing ends 20 of the centerpiece 12. The guides 16 are collinear. In one embodiment, the guides 16 are squarely shaped when viewed longitudinally. In another embodiment, the guides 16 are tubular. Each guide 16 has an inner end 22 positioned proximate to the centerpiece 12. In one embodiment, the inner ends 22 are tapered such that an upper surface 24 of a respective guide 16 is dimensionally shorter that a lower surface 26 of the respective guide 16.

Each of a pair of safety blocks 28 is selectively couplable to a respective inner end 22 of a respective guide 16. The safety blocks 28 are positioned on the guides 16 such that the safety blocks 28 define a channel 30. The channel 30 is configured to insert a blade of the miter saw. In one embodiment, each safety block 28 comprises a first tongue 32. Each first tongue 32 is complementary to a respective inner end 22. The first tongue 32 is positioned on a respective safety block 28 such that the first tongue 32 is positioned to insert through the respective inner end 22 into the respective guide 16 to selectively couple the safety block 28 to the centerpiece 12. In one embodiment, the safety blocks 28 comprise wood.

Each of a pair of extensions 34 comprises a support 36 and a plate 38. The support 36 is reversibly couplable to a respective opposing end 20 of the centerpiece 12. The plate 38 extends perpendicularly from a front 40 of the support 36 adjacent to a bottom 42 of the support 36. In one embodiment, the extensions 34 and the centerpiece 12 comprise metal. In another embodiment, the extensions 34 and the centerpiece 12 comprise aluminum.

Each of a pair of second tongues 44 is coupled to and extends from a first end 46 of a respective support 36. The second tongue 44 is dimensionally smaller that the respective support 36. The second tongue 44 is complementary to a respective guide 16. The second tongue 44 is positioned on the support 36 such that the second tongue 44 is positioned to insert into the respective guide 16 to couple the extension 34 to the centerpiece 12.

Each guide 16 comprises a pair of holes 48 that is positioned through the upper surface 24 of the guide 16. The holes 48 are positioned in the upper surface 24 such that the holes 48 are configured for the user to view a respective second tongue 44 as the respective second tongue 44 is inserted into the guide 16.

Each of a pair of caps 50 is complementary to a respective guide 16 and a respective support 36 when the respective support 36 is coupled to the respective guide 16. The cap 50 is reversibly and slidably couplable to the respective guide 16 and the respective support 36. The cap 50 is positioned to slidably couple to the respective guide 16 such that a respective safety block 28 is selectively coupled to the respective guide 16.

The present invention also anticipates a pair of legs that is coupled singly to each of the extensions 34. The legs would be extendable perpendicularly from the extensions 34 to a surface to support the extensions 34. The legs would maintain the plates 38 coplanarly positioned with the upper face of the table of the miter saw. In one embodiment, each leg would be hingedly coupled to a respective extension 34.

In use, the centerpiece 12 is configured to couple to the table of the miter saw. The safety blocks 28 are positioned on the guides 16 such that the safety blocks 28 define a channel 30. The channel 30 is configured to insert a blade of the miter saw. The supports 36 are positioned to couple to the centerpiece 12 such that the plates 38 are positioned coplanarly with an upper face of the table. The plates 38 are configured for placement of a piece of wood. The piece of wood is positioned for cutting with the blade of the miter saw.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A miter saw extendable fence attachment comprising:
a centerpiece complementary to a table of a miter saw, said centerpiece being configured for attachment to the table, said centerpiece comprising:
a connector, said connector being arcuate, and
a pair of guides, said guides being coupled singly to and extending from opposing endpoints of said connector defining opposing ends of said centerpiece, said guides being collinear, said guides being squarely shaped when viewed longitudinally, said guides being tubular, each said guide having inner end proximate to said connector, said inner ends being tapered such that an upper surface of a respective said guide is dimensionally shorter that a lower surface of said respective said guide;
a pair of safety blocks, each said safety block being selectively couplable to a respective said inner end of a respective said guide, wherein said safety blocks are positioned on said guides such that said safety blocks define a channel, wherein said channel is configured for insertion of a blade of the miter saw, each said safety block comprising a first tongue, each said first tongue being complementary to a respective said inner end, wherein said first tongue is positioned on a respective said safety block such that said first tongue is positioned for insertion through said respective said inner end into said respective said guide to selectively couple said safety block to said centerpiece, said safety blocks comprising wood;
a pair of extensions, each said extension comprising a support and a plate, said support being reversibly couplable to a respective said opposing end of said centerpiece, said plate extending perpendicularly from a front of said support adjacent to a bottom of said support, said extensions and said centerpiece comprising metal comprising aluminum;
a pair of second tongues, each said second tongue being coupled to and extending from a first end of a respective said support, said second tongue being dimensionally smaller that said respective said support, said second tongue being complementary to a respective said guide, wherein said second tongue is positioned on said support such that said second tongue is positioned for insertion into said respective said guide to couple said extension to said centerpiece;
each said guide comprising a pair of holes positioned through said upper surface of said guide, wherein said holes are positioned in said upper surface such that said holes are configured for the user to view a respective said second tongue as said respective said second tongue is inserted into said guide;
a pair of caps, each said cap being complementary to a respective said guide and a respective said support when said respective said support is coupled to said respective said guide, said cap being reversibly and slidably couplable to said respective said guide and said respective said support, wherein said cap is positioned to slidably couple to said respective said guide such that a respective said safety block is selectively coupled to said respective said guide; and
wherein said centerpiece is configured for coupling to the table of the miter saw, wherein said supports are positioned for coupling to said centerpiece such that said plates are positioned coplanarly with an upper face of the table, such that said plates are configured for placement of a piece of wood, wherein the piece of wood is positioned for cutting with the blade of the miter saw.

* * * * *